Oct. 2, 1928.
H. W. SWEET
1,686,352
ADJUSTABLE CLUTCH BRAKE
Filed Sept. 23, 1926  2 Sheets-Sheet 1
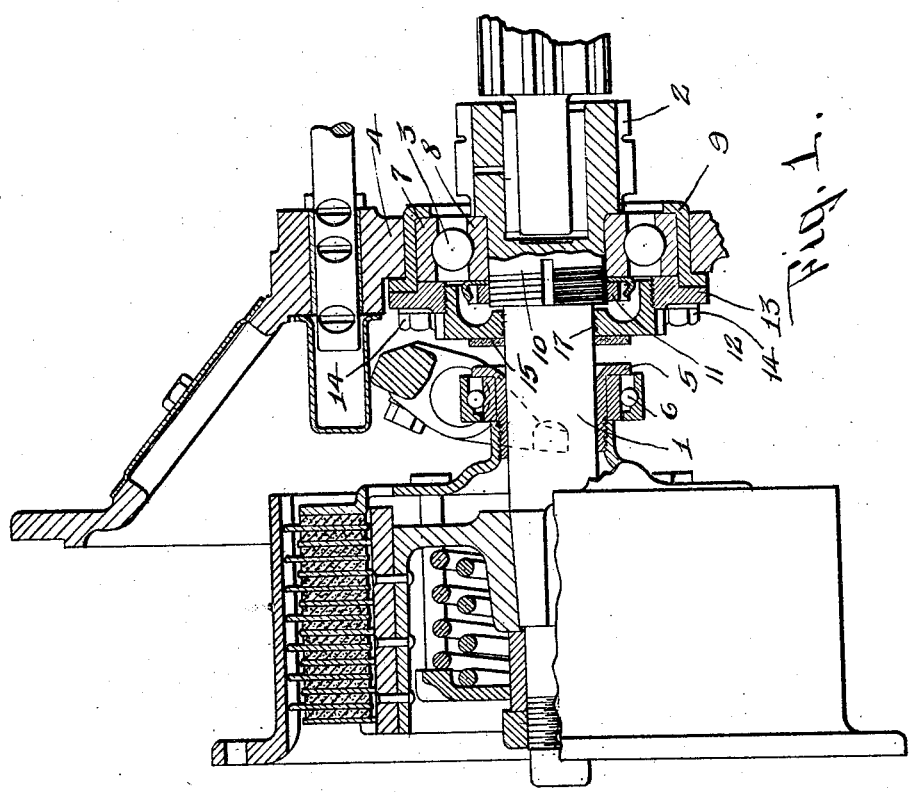
INVENTOR.
Henry W. Sweet
BY
Parsons & Bodell
ATTORNEYS.

Oct. 2, 1928.
H. W. SWEET
ADJUSTABLE CLUTCH BRAKE
Filed Sept. 23, 1926
1,686,352
2 Sheets-Sheet 2
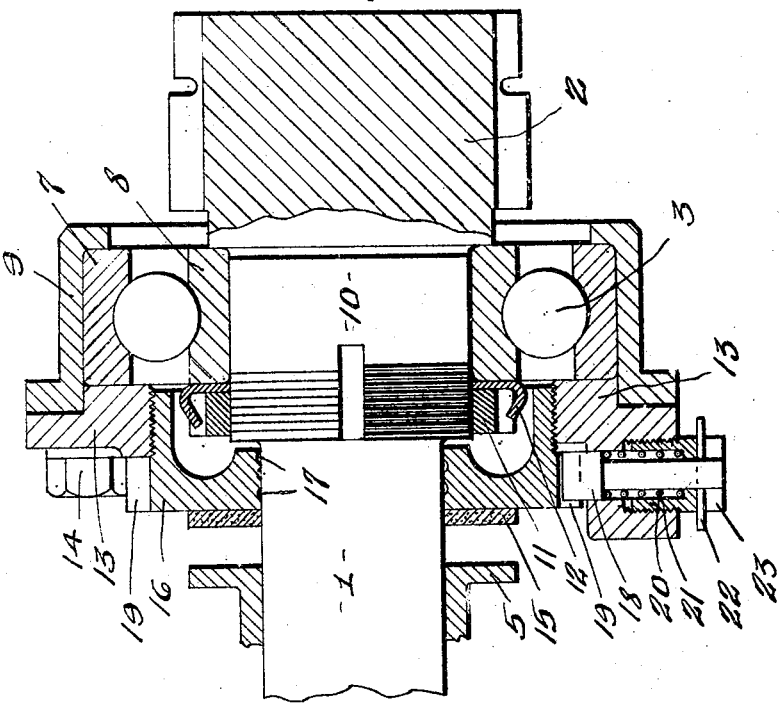
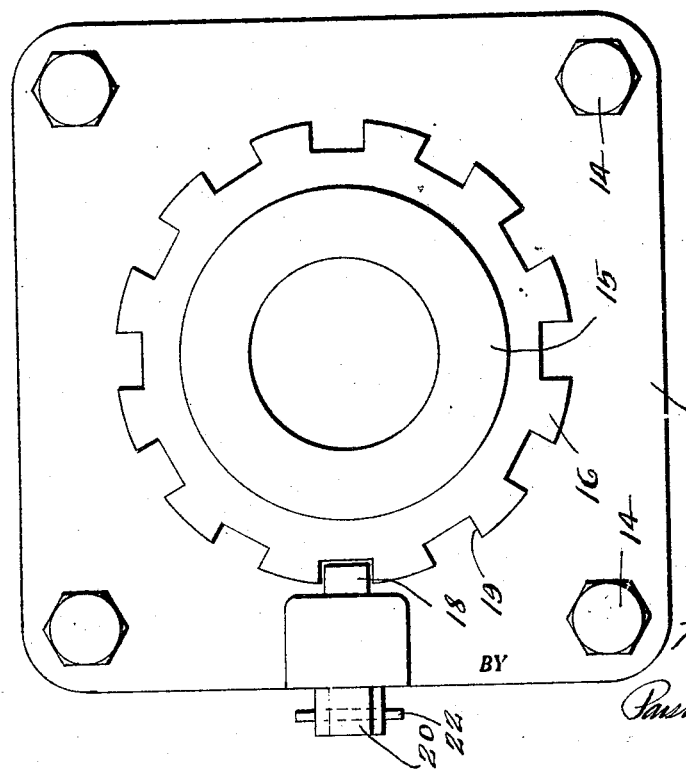
INVENTOR.
Henry W. Sweet
BY Parsons & Birdsell
ATTORNEYS.

Patented Oct. 2, 1928.

1,686,352

UNITED STATES PATENT OFFICE.

HENRY W. SWEET, OF SYRACUSE, NEW YORK, ASSIGNOR TO BROWN-LIPE GEAR COMPANY, OF SYRACUSE, NEW YORK, A CORPORATION OF NEW YORK.

ADJUSTABLE CLUTCH BRAKE.

Application filed September 23, 1926. Serial No. 137,268.

This invention relates to motion transmitting mechanism such as are used in automobiles and has for its object a particularly simple, efficient, durable and adjustable brake for retarding the rotation of the driven member of the clutch when the clutch is released.

The invention consists in the novel features and in the combinations and constructions hereinafter set forth and claimed.

In describing this invention, reference is had to the accompanying drawing in which like characters designate corresponding parts in all the views.

Figure 1 is a side elevation, partly in section and partly broken away of the transmission mechanism embodying my invention.

Figure 2 is a fragmentary detail view thereof.

Figure 3 is an elevation of the bearing cap and contiguous parts.

Figure 4 is a detail view of the lock for the bearing cap.

This motion transmitting mechanism comprises generally, a clutch of any suitable construction including the usual shaft and throw-out collar slidable axially of the shaft, a support for the shaft in the rear of the throw-out collar, this support being usually the front wall of the transmission gear casing, a bearing in said wall in which the shaft is journalled and means associated with said bearing and adjustable axially of the shaft in the rear of the throw-out collar, said means being connected to the bearing to be adjustable axially thereof relatively to the shaft and having a braking element opposed to the rear face of the throw-out collar whereby when the throw-out collar is actuated to release the clutch, rotation thereof is retarded by said brake element and whereby it can be adjusted to take up wear of the brake element. The clutch may be of any suitable form, size and construction and as many forms of these clutches are well known and understood, detail construction is thought to be unnecessary.

All of these clutches include a driven shaft as 1 which is usually the stem of a stem gear 2 of the usual transmission gearing, the shaft or stem of the gear being journalled in an anti-friction bearing 3 mounted in the front wall 4 of the transmission gear case which front wall forms the support for the rear end of the shaft as will be understood by those skilled in the art.

The clutch also includes a throw-out collar 5 slidable on the shaft 1 and rotatable therewith as it is part of the driven element of the clutch. This throw-out collar has a throw-out bearing 6 which coacts with the yoke operated by the usual clutch pedal of an automobile, all of which will be understood by those skilled in the art.

The bearing 3 is here shown as an anti-friction bearing including outer and inner rings 7 and 8 and anti-friction bearings as balls between the rings. The outer ring 7 is mounted in a cup or casing 9 secured in an opening in the wall 4 of the transmission gear case and the inner ring 8 mounted on an enlargement 10 of the shaft 1. The inner ring is held from axial displacement by a nut 11 threading on the enlargement 10 against the ring 8 or an interposed lock washer 12. The bearing further includes a bearing cap 13 secured to the casing 9 or the wall 4 by cap screws 14 in the usual manner, this bearing cap thrusting against the outer ring 7.

The bearing cap includes an outer body portion and an inner or central part or hub adjustable axially relatively to the outer body portion, this central portion or hub being opposed to the throw-out collar 5 and also engaging the periphery of the shaft 1. A braking element or disk 15 is interposed between the collar 5 and this inner central part or hub 16. The inner central part or hub is here shown as a collar which threads into the bearing cap 13 and which is provided with an oil feeding or retaining groove 17 around the shaft 1. When the throw-out collar 5 is moved rearwardly to release the clutch, it engages the braking element or disk 15 and presses it against the part or collar 16 thus retarding the rotation of the driven member of the clutch when the clutch is released.

Means is provided for holding the member 16 in its adjusted position, this means being here shown as a spring pressed plunger 18 carried by the body portion of the bearing cap and coacting with the toothed periphery 19 of the central part or hub 16. This plunger 18 is shown as located in an externally threaded barrel 20 which threads into a radial passage in the outer body of the bearing cap 13. A spring 21 is located between the head of the plunger and the internal shoulder in the barrel. The plunger at its outer end extends outside of the barrel and is provided with a diametrically extending pin 21, and the outer end of the barrel is also formed with a complemental slot 23. The pin normally lies in the slot.

To release the plunger from the collar 16 when it is desired to turn the collar to take up for wear of the brake disk 15, the plunger is moved axially until the pin 21 is out of the slot 23 and then the plunger is turned to bring the pin out of alinement with the slot.

In operation, to adjust the collar 16 to take up for wear of the brake disk 15, the operator after removing the hand hole cover in the clutch casing inserts a screw driver or other tool and engages the pin 22 to shift it axially and give it a partial turn to hold the plunger 18 in its inoperative position. The operator can then with a screw driver turn the collar 16 as much as desired and then release the plunger 18 by turning it so that the pin 22 can enter the slot 23.

This invention is particularly advantageous in that it provides an exceptionally simple construction by which the clutch brake can be adjusted for wear.

What I claim is:

1. In a motion transmitting mechanism, the combination of a clutch including a shaft, a throw-out collar slidable along the shaft, a support for the shaft in the rear of the throw-out collar, the shaft having a bearing in said support and a member carried by the support and opposed to the throw-out collar and adjustable axially of the shaft, said member having brake means for coacting with the throw-out collar when the same is actuated to release the clutch.

2. In a motion transmitting mechanism, the combination of a clutch including a shaft, a throw-out collar slidable along the shaft, a support for the shaft in the rear of the throw-out collar, the shaft having a bearing in said support, a bearing cap for said bearing having an outer body and a central part enclosing the shaft and threading into the body, said part being opposed to the throw-out collar and brake means interposed between said collar and part to retard the rotation of the throw-out collar when the same is actuated to release the clutch.

3. In a motion transmitting mechanism, the combination of a clutch including a shaft, a throw-out collar slidable along the shaft, a support for the shaft in the rear of the throw-out collar, the shaft having a bearing in said support, a bearing cap for said bearing having an outer body and a central part enclosing the shaft and said part being opposed to throw-out collar, brake means interposed between said collar and said part to retard the rotation of the throw-out collar when the same is actuated to release the clutch, said part being adjustable axially of the body of the part and means carried by the bearing cap for holding the adjustable collar in its adjusted position.

4. In a motion transmitting mechanism, the combination of a clutch including a shaft, a throw-out collar slidable along the shaft, a support for the shaft in the rear of the throw-out collar, the shaft having a bearing in said support, a bearing cap for said bearing having an outer body and a central part enclosing the shaft and threading into the body, said part being opposed to the throw-out collar, brake means interposed between said collar and said part to retard the rotation of the throw-out collar when the same is actuated to release the clutch, said central part of the bearing cap being adjustable axially of the body and provided with a toothed periphery and a locking member carried by the body of the cap to coact with said toothed periphery.

5. In a motion transmitting mechanism, the combination of a clutch including a shaft, a throw-out collar slidable along the shaft, a support for the shaft in the rear of the throw-out collar, the shaft having a bearing in said support, a bearing cap for said bearing having an outer body and a central part enclosing the shaft and threading into the body, said part being opposed to the throw-out collar, brake means interposed between said collar and the central part to retard the rotation of the throw-out collar when the same is actuated to release the clutch, said central part of the bearing cap being adjustable axially of the body of the cap and said body being provided with a spring pressed locking member for coacting with the periphery of the central part of the cap.

6. In a motion transmitting mechanism, the combination of a clutch including a shaft, a throw-out collar slidable along the shaft, a support for the shaft in the rear of the throw-out collar, the shaft having a bearing in said support, the bearing including a hub adjustable axially of the shaft toward and from the throw-out collar and brake means interposed between the throw-out collar and said hub.

7. In a motion transmitting mechanism, the combination of a clutch including a shaft, a throw-out collar slidable along the shaft, a gear casing in the rear of the clutch, the shaft being journalled in the front wall of said casing, a bearing in said wall for the shaft including a bearing cap including a main body and a central hub adjustable axially of the body and coacting with the shaft, the central hub being opposed to the throw-out collar and brake means interposed between said throw-out collar and said hub part.

In testimony whereof, I have hereunto signed my name at Syracuse, in the county of Onondaga, and State of New York, this 21st day of Sept., 1926.

HENRY W. SWEET.